Figure 1:
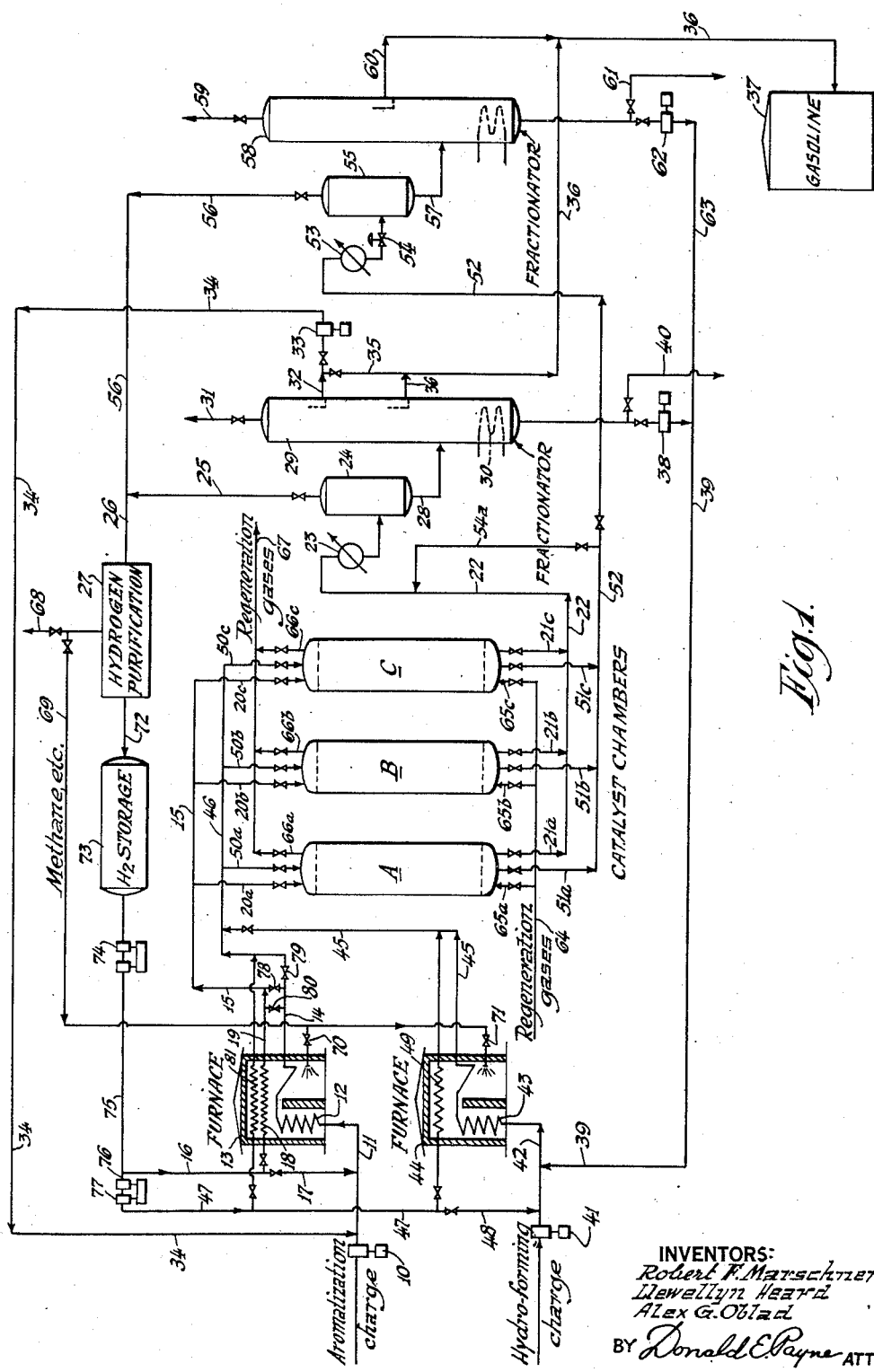

June 29, 1943. R. F. MARSCHNER ET AL 2,322,863
DEHYDRO-AROMATIZATION AND HYDRO-FORMING
Filed Sept. 13, 1939 2 Sheets-Sheet 1

INVENTORS:
Robert F. Marschner
Llewellyn Heard
Alex G. Oblad
BY Donald E. Payne ATTY.

June 29, 1943.   R. F. MARSCHNER ET AL   2,322,863
DEHYDRO-AROMATIZATION AND HYDRO-FORMING
Filed Sept. 13, 1939   2 Sheets-Sheet 2

INVENTORS:
Robert F. Marschner
Llewellyn Heard
Alex G. Oblad
BY Donald E. Payne ATTY.

Patented June 29, 1943

2,322,863

UNITED STATES PATENT OFFICE 2,322,863

DEHYDROAROMATIZATION AND HYDROFORMING

Robert F. Marschner, Chicago, Ill., Llewellyn Heard, Hammond, Ind., and Alex G. Oblad, Chicago, Ill., assignors to Standard Oil Company, Chicago, Ill., a corporation of Indiana Application September 13, 1939, Serial No. 294,779

7 Claims. (Cl. 196—52)

This invention relates to the production of high quality motor fuel from naphthas and other charging stocks by a catalytic dehydro-aromatization process operated in a new and unique combination with a hydro-forming process. In catalytic dehydro-aromatization processes hydrogen is produced and the catalyst becomes spent due in part at least to the deposition of carbonaceous material on the catalyst and the conversion of catalyst oxides to sulfides. In catalytic hydro-forming processes, which are operated under considerably higher pressures, hydrogen is consumed, carbonaceous materials may be actually removed from the catalyst and there is a net consumption of hydrogen. An object of our invention is to integrate processes of catalytic dehydro-aromatization and catalytic hydroforming to form a self-contained system which requires no hydrogen from outside sources, whereby the advantages of each process may be obtained without certain of its respective disadvantages.

A further object is to utilize catalyst material more effectively than has heretofore been possible. The large carbon deposits resulting from dehydro-aromatization have heretofore required oxidation for regeneration. The burning of this catalyst material has presented serious problems of temperature control and heat utilization. An object of our invention is to remove a substantial portion of the carbonaceous material from the catalyst without burning and to make available where it is needed the heat produced in the elimination of such carbonaceous material.

The sulfur present in most dehydro-aromatization charging stocks converts catalytic oxides into sulfides and thus apparently poisons the catalyst function as a hydrogen producer. These sulfides are desirable in hydro-forming reactions in which hydrogen is consumed. An object of our invention is to utilize a catalyst which would otherwise require regeneration before further use as a dehydro-aromatization catalyst, under different conditions whereby it may function for a considerable period as a hydro-forming catalyst prior to regeneration.

A further object of our invention is to obtain increased yields of high octane number gasoline from a given naphtha or other charging stock. Another object is to convert at least a part of the carbonaceous deposit on dehydro-aromatization catalyst material into hydrocarbon gases or vapors.

Another object is to prolong catalyst life between regeneration periods and to minimize the required severity of regeneration. In other words, we wish to effect at least partial regeneration by the hydro-forming reaction itself so that the amount of oxidation may be reduced to a minimum, thus avoiding or considerably reducing the difficulties which have heretofore been obtained on dehydro-aromatization catalyst regeneration.

A further object is to provide a method and means for effecting dehydro-aromatization and hydro-forming in the same unitary system whereby the hydrogen produced in one operation will be consumed in the other, and whereby a stock may be first aromatized and then further amounts of said stock, or different stocks, may be hydro-formed with the hydrogen produced during the aromatization reaction by contact with a catalyst which is at least partially spent for dehydro-aromatization. Other objects will be apparent as the detailed description of our invention proceeds.

We have discovered that dehydro-aromatization catalysts such as VI Group metal oxides deposited on alumina are effective catalysts for hydro-forming even though they may be substantially spent for the aromatization reaction. We have applied this discovery to practical commercial use by providing a system which may be operated under both high and low pressures, whereby a catalyst may first be used for aromatization under relatively low pressure conditions and when partially spent may be used for hydroforming under relatively high pressures. We have found that the partially spent catalyst is not only effective for the hydro-forming reaction but that a considerable amount of the carbonaceous deposit on the catalyst is actually converted into hydrocarbons by hydro-forming, thus increasing the total hydrocarbon yield and minimizing the amount of oxidation thereafter required for regeneration.

Preferably, we contact naphtha vapors at about 875 to 1075° F. with a dehydro-aromatization catalyst in the presence of hydrogen in the range of 0.4 to 8 mols per mol of oil at relatively low pressures which may range from about 30 to 300 (not over 450), preferably about 200 pounds per square inch, and with a space velocity of about 0.04 to 10 volumes of liquid charging stock per volume of catalyst space per hour. After the catalyst has been on stream for about 2 to 20 hours, for example about 10 hours, the pressure is substantially increased and the partially spent catalyst is utilized for hydro-forming for a further period of time which may range from 2 to 20 hours or longer. The temperature during the hydro-forming step will depend on the nature of the charging stock; for naphthas of the gasoline boiling range it will preferably be lower than the temperatures employed for dehydro-aromatization, but when heavy polymers or stocks of the gas oil boiling range are employed the temperatures may be substantially the same as those used for the dehydro-aromatization step. The hydro-forming temperature should not materially exceed about 1025° F. because at such high temperatures there is a tendency toward the conversion of hydrocarbons to carbon instead of the desired conversion of carbonaceous materials to hydrocarbons. The space velocity during the hydro-forming step may be substantially the same as for dehydro-aromatization.

The remaining recycled hydrogen from the hydro-forming step and the hydrogen produced from the aromatization step may be purified for the removal of hydrocarbons and returned for use in both steps, the separated methane, etc. being available for fuel in the conversion furnaces. Heavier-than-gasoline products from both steps may be returned for destructive hydrogenation (hydro-forming) and the light gasoline fractions (i. e., $C_6$ to $C_8$) if they do not have the desired octane number, may be recycled to the aromatization step.

Figure 2:
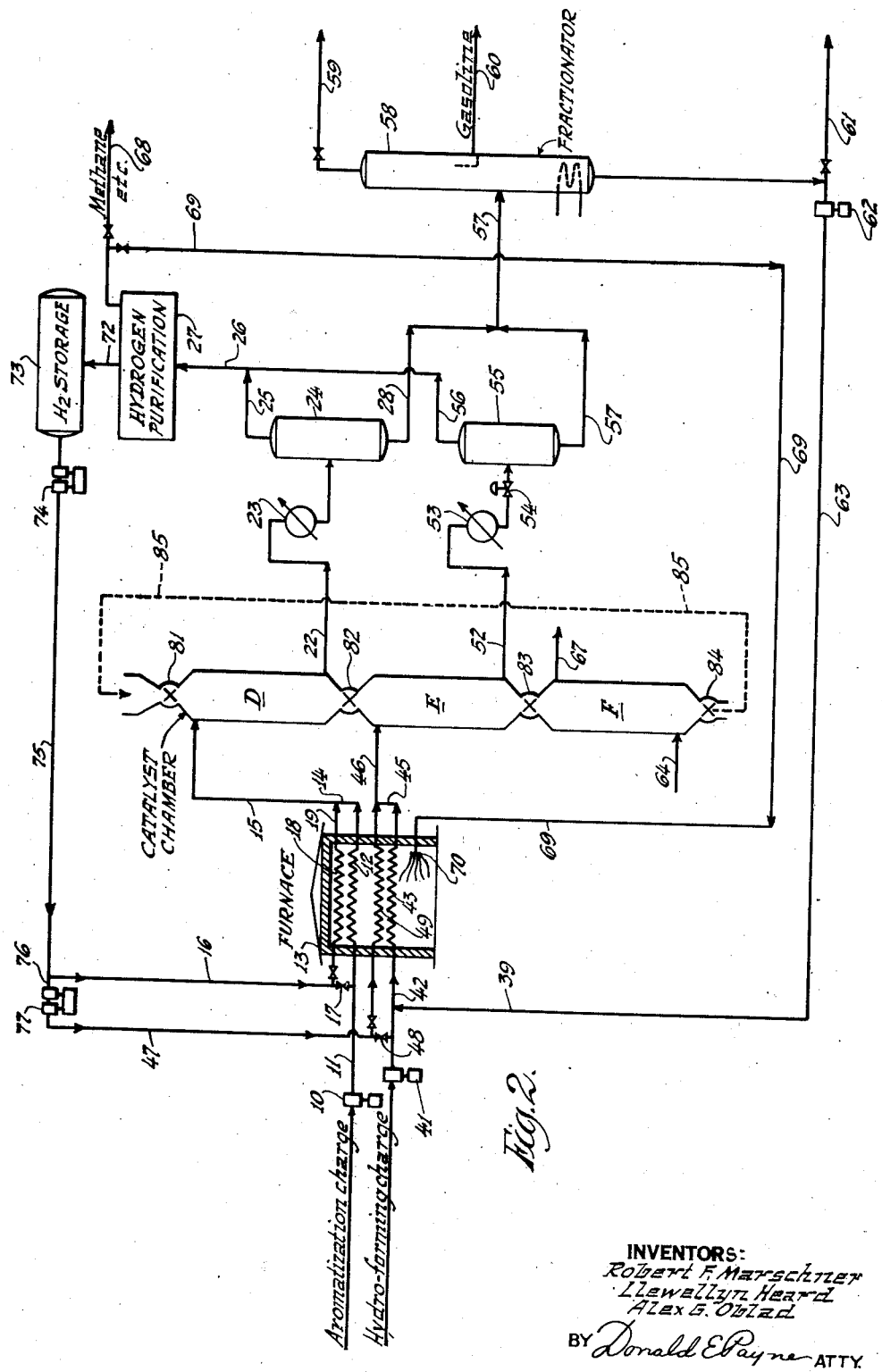

The invention will be more clearly understood from the following detailed description and from the accompanying drawings which form a part of this specification, in which:

Figure 1 is a flow diagram illustrating the application of our invention to a fixed bed catalyst system; and Figure 2 is a flow diagram illustrating the application of our invention to a moving bed catalyst system.

Our invention is not limited to any particular naphtha, nor to a naphtha of any particular boiling range in the dehydro-aromatization step. The naphtha may be either straight run or cracked (although preferably straight run) and it may be produced by the hydrogenation of carbonaceous materials by the catalytic conversion of carbon monoxide with hydrogen or by any other known method. Generally speaking, the charging stocks for this step are aliphatic hydrocarbons consisting of open chain (both straight and branched chain), hydrocarbons of from 6 to 12 or 14 carbon atoms together with associated naphthenes.

The charging stock for the hydro-forming step may be the same as that used for dehydro-aromatization or it may be a refractory cycle stock such as the stocks which normally result from the thermal or catalytic cracking of gas oils. Alternatively, it may be a residual oil or finely divided lignites or coals dispersed in such a cycle stock, although such dispersion usually requires liquid phase operation while we prefer to operate both steps in vapor phase. The hydro-forming charging stock may also comprise products from polymerization, alkylation or other conversion processes. Stocks high in sulfur may be charged.

Our catalyst is preferably an oxide of a VI group metal mounted on active alumina. About 2 to 10% of molybdenum oxide on alumina or about 8 to 40% of chromium oxide on alumina have been found to give excellent results. Generally speaking, we prefer to employ metals or the oxides of the metals, molybdenum, chromium, tungsten, vanadium or any mixture thereof mounted on bauxite, precipitated alumina, activated alumina, alumina gel or any other suitable catalyst support. Magnesium, aluminum or zinc chromites, molybdenites, etc., may be employed since it has been found that the VI Group metal is particularly active when it is in the anion. Certain oxides of metals from groups IV and V, for example vanadium and cerium oxides have been found to be effective for the conversion. Oxides of copper, nickel, manganese, etc., may be included to facilitate regeneration or for supplementing catalyst activity, but it should be understood that our invention cannot be practiced with the use of simple nickel catalysts heretofore employed for hydrogenation and dehydrogenation reactions.

These catalysts may be made by impregnating activated alumina or other support with molybdic acid, ammonium molybdate or any other catalyst compound decomposable by heat. Also, the aluminum and molybdic oxide may be co-precipitated as a gel or the separate oxides may be mixed together as a paste, dried, extruded under pressure or pelleted and heated to temperatures of about 900 to 1200° F.

The following is particularly recommended as a method of preparing our dehydro-aromatization catalyst. An aqueous solution of about 250 kilograms of $Al(NO_3)_3 \cdot 9H_2O$ and sufficient water to make about 1800 liters is precipitated in the cold by an aqueous solution of ammonium hydroxide and ammonium molybdate (in weight ratio of 90:10) in enough water to make about 1200 liters. The precipitate of gelatinous nature is filtered by suction to a semi-gel, dried at about 300° F., and heated for one hour at about 1000 to 1200° F. The catalyst is then ready for use and it consists of about 90% alumina and 10% molybdenum oxide by weight, it being understood of course that varying amounts of molybdenum oxide may thus be incorporated.

This same method may be employed for making alumina-chromium oxide catalyst, alumina-vanadium oxide, alumina-tungsten and alumina-uranium catalysts or mixtures thereof. We have found that catalyst prepared in the above manner may be of even higher activity after revivification than when originally produced, that they give higher octane numbers than catalysts prepared in other manners, and that they cause less degradation to coke and gas. Particularly in the case of chromium oxide, we believe that the resulting product of the above reaction contains the chromium oxide in a chemically combined state or at any rate, in a more active state than is usually otherwise obtained. On addition of the ammonium solutions a yellow gelatinous mass is obtained which filters readily and the final product after drying and heating is vari-colored and granular. Some of the gels, for instance the tungsten gel, is originally white, while others such as vanadium, chromium, etc., are a yellowish color. On drying and heating there is considerable reduction in volume—filtered gel of about 20 volumes yielding a final catalyst of only about 1½ volumes. This final product was usually granular and of yellow-green variegated color.

The catalyst may be employed in fixed beds, in movable beds or as a powder suspended in a gaseous stream, the conversion in most cases being in the vapor phase. The fixed bed catalysts may be positioned in tubes mounted for instance in the convection section of a furnace, or they may be positioned in a single bed or plurality of beds in vertical towers or chambers. The moving catalyst may be charged to the top of a tower or tube, either continuously or intermittently, the spent catalyst being withdrawn from the base of the tube at substantially the same rate; in this case the reaction takes place continuously and under substantially constant conditions of temperature and pressure, the regeneration being effected outside of the conversion zone.

When powdered catalyst is employed it may be fed into a rapidly moving stream of vaporized naphtha and hydrogen, or it may be charged with the oil as a slurry through the heating tubes; in either case it is separated from the vapors after the reaction is completed and separately regenerated by oxygen while suspended in flue gas. In the case of powdered catalyst, the expression "space velocity" is not strictly applicable, the equivalent effect is obtained by using about 1 to 5 volumes of catalyst per volume of oil and using a contact time of about 5 to 200 seconds. Any of these specific catalyst reactors or their equivalents may be used in practicing the invention but they will not be described in further detail.

Referring specifically to Figure 1—a straight run naphtha is charged by pump 10 to line 11 and heating coils 12 and furnace 13, thence through transfer line 14 to low pressure manifold 15. Hydrogen from line 16 may be introduced with the feed through line 17 or passed through separate heating coil 18, thence through transfer line 19 to low pressure manifold 15. About 0.4 to 4 mols of hydrogen are preferably employed per mol of naphtha, the pressure is preferably about 30 to 300, for example 200 pounds per square inch, and the temperature is about 875 to 1075, for example about 950° F. At such temperatures and pressures the hot vapors in admixture with hydrogen are passed by one of the branch lines 20a—b—c into the corresponding catalyst chamber A, B or C. Assuming that chamber A contains clean catalyst, this aromatization charging stock will be introduced through line 20a thereto, and the reaction products will be withdrawn therefrom through line 21a, line 22 and cooler 23 to hydrogen separator 24, which is preferably operated at substantially reaction pressure and at a temperature of about 35 to 105° F. The separated hydrogen is withdrawn through lines 25 and 26 to purification system 27. Liquids are withdrawn through line 28, are preferably heat exchanged with aromatization products in an exchanger (not shown) and are then introduced into fractionating column 29 which is provided with suitable reboiling means 30. The $C_1$ to $C_3$ hydrocarbons, with perhaps some $C_4$ hydrocarbons are taken overhead through line 31 for use as a fuel or for further conversion processes such as alkylation, gas reversion, polymerization, etc. If the $C_6$ to $C_8$ hydrocarbons have not been sufficiently aromatized they may be withdrawn through line 32 and passed by pump 33 and line 34 back to line 11. Alternatively, they may be passed by line 35 for admixture with gasoline fractions taken as a side cut through line 36, which leads to a gasoline storage tank 37. The products heavier than gasoline may be passed by means of pump 38, line 39 to the hydro-forming step which will hereinafter be described, or they may be withdrawn from the system through line 40.

After catalyst chamber A has been on a stream for a period of about 2 to 20 hours, which period will vary, depending on different catalyst compositions and different charging stocks as well as on different operating conditions, the valve in lines 20a and 21a are closed and the valves in lines 20b and 21b are opened, so that B becomes the catalyst chamber for dehydro-aromatization under the operating conditions hereinbefore described for chamber A. The catalyst in chamber A, which for example may have been on stream for about 10 hours, contains appreciable quantities of deposited carbonaceous materials and appreciable quantities of the catalyst oxides have been converted to sulfides. Instead, however, of regenerating this catalyst by oxidation in accordance with prior practice, we utilize the catalyst for effecting a hydro-forming reaction, i. e., either destructive or non-destructive hydrogenation.

The stock for the hydro-forming reaction, which may be the same stock or olefin polymers, virgin naphtha, cracked naphtha, coke still naphtha, light virgin and cycle gas oils, heavy hydrocarbon refractory mixtures, etc., are introduced by pump 41 to line 42 to coils 43 which may be mounted in furnace 13 or in a separate furnace 44, thence through transfer line 45 to high pressure manifold 46. Hydrogen under high pressure from line 47 may be introduced through line 48 to line 42 or may be heated in separate coil 49 and introduced into transfer line 45. For the hydro-forming step the hydrogen should be present in amounts of about 5 to 50 mols per mol of charging stock. The temperature will depend upon the nature of the charging stock; when olefinic naphtha fractions are being hydrogenated (saturated) relatively low temperatures of about 400 to 700° F., for example about 520° F. are used. When higher boiling charging stocks are used and destructive hydrogenation is effected the temperatures are usually lower than those used for dehydro-aromatization, i. e., about 700 to 950° F., for example, about 900° F. All other things being equal, we prefer to employ as low a temperature as possible in the hydro-forming step for effecting the desired results because we have found that as the temperatures are lowered the tendency for conversion of carbonaceous material in the catalyst into hydrocarbons is increased.

The pressure in the hydro-forming step is necessarily much higher than the pressure used for dehydro-aromatization and while it may range from about 750 to 3000 pounds we prefer to maintain it at at least 300 pounds higher than the pressure used in the dehydro-aromatization step, and in such operations it may advantageously be effected at about 500 to 1000 pounds per square inch. This step consumes hydrogen.

At such temperatures and pressures and in the presence of hydrogen the hydro-forming charging stock vapors are passed through catalyst chamber A, being introduced by line 50a and the products of reaction being withdrawn through line 51a, thence through line 52, cooler 53 and pressure-reducing valve 54 to hydrogen separator 55 which is maintained at about the same pressure and temperature as separator 24. In fact, material at this point may be introduced into separator 24 through line 54a. Hydrogen passes overhead through line 56 and line 26 to purification system 27. Liquid hydroformed products pass through line 57, preferably heat exchanged with hydro-formed products in an exchanger (not shown) and are introduced into fractionating column 58 from which gases are taken overhead through line 59, gasoline fractions are withdrawn through line 60 to storage tank 37 and heavier than gasoline fractions are withdrawn from the system through line 61 are recycled by pump 62 in lines 63 and 39 to line 42.

After chamber A has been used for the hydroforming operation for about 2 to 20 hours, for example about 10 hours, a considerable amount of the carbonaceous material thereon has been converted into hydrocarbon gases and vapors and has been removed from the system. In some cases it is then possible to alternate chambers A and B, using chamber A once more for dehydro-aromatization and chamber B for hydro-forming. After a tower has been on stream for a considerable time, however, there is usually a considerable conversion of the oxides to sulfides or to a lower state of oxidation and it is therefore necessary to regenerate the catalyst by oxidation. While chambers A and B are on stream chamber C may be regenerated by introducing an oxygen-containing gas through line 64 and line 65c, the oxidation products being moved from the system through line 66c and line 67. The amount of oxidation is, of course, much less than has heretofore been required for dehydroaromatization catalysts and the problems of temperature control and heat utilization are relatively simple. As soon as chamber C has been regenerated and purged free of oxygen-containing gases it may go on stream as the dehydroaromatization zone, while chamber A is being regenerated and chamber B is used for hydroforming.

During the hydro-forming process substantial quantities of carbonaceous material on the catalyst are converted into methane and other hydrocarbons. Such methane and hydrocarbon gases may be removed from the hydrogen by scrubbing with such hydrocarbon solvents as naphtha, gas oil, etc., and withdrawn through the system through line 68 or passed by lines 69 and 70 for combustion in furnace 13 or through lines 69 and 71 for combustion in furnace 44. The purified hydrogen is passed by line 72 to storage tank 73. From this tank it is forced by compressor 74 through line 75 to line 16 or through line 76 and compressor 77 to line 47.

While we have described the use of different stocks for dehydro-aromatization and hydroforming, respectively, it should be understood that the same stock suitable for dehydro-aromatization may be used for both purposes, in which case it may be heated under the relatively high pressure in coils 12. When so operated valve 78 will be closed and valve 79 will permit the heated vapors under high pressure to be passed directly to the high pressure manifold 46. The portion of the charging stock going to low pressure manifold 15 will in such cases pass through a pressure-reducing valve 80 to line 19. The high pressure hydrogen may be heated in a separate heating coil 81 and thence introduced to the high pressure manifold 46.

In Figure 2 we have shown our invention as applied to a moving bed catalyst system wherein fresh catalyst enters chamber D through valve closure 81, partially spent catalyst from chamber D enters chamber E through valve closure 82, spent catalyst from chamber E enters regenerating chamber F through valve closure 83, and wherein catalyst from the regeneration chamber after purging is withdrawn through valve closure 84 and recycled through a conveyor system 85 for reintroduction into chamber D. In such a system the fresh catalyst is used for dehydroaromatization under the conditions hereinbefore described and while concurrent flow is illustrated it should be understood that countercurrent flow may likewise be used. Chamber E is maintained under the high pressure hydro-forming conditions. The products from dehydro-aromatization and hydro-forming are fractionated in a single column 58 and in this connection it should also be understood that a single hydrogen separating tank may likewise be used, i. e., material from pressure reduction valve 54 may be introduced into separator 24, thereby entirely dispensing with separator 55. Under some circumstances no oxidation type regeneration is required, in which case catalyst leaving valve 83 may be returned through valve 81 or line 64 may be closed. Similar apparatus in Figure 2 is designated by the same reference characters as is employed in Figure 1 and further description therefore appears to be unnecessary.

If powdered catalyst were employed the catalyst material from the dehydro-aromatization zone would be separated in a cyclone separator and thence passed to the hydro-forming step, the catalyst from the hydro-forming step being again recovered in a cyclone separator for regeneration.

From the above detailed description many other modifications will be apparent to those skilled in the art and we do not limit ourselves to any of the specific details herein described. It is understood that heat exchange means, pumps, compressors, valves, automatic control means, etc., will be employed in accordance with sound engineering practice, and such expedients have been illustrated only to the extent necessary for describing the invention.

We claim:

1. The method of increasing the effective utilization of a dehydro-aromatization catalyst which comprises contacting it with low knock rating naphtha under such conditions that the naphtha is dehydro-aromatized and hydrogen is produced, namely, at pressures below 450 pounds per square inch at temperatures of about 875 to 1025° F. and space velocities of about .2 to 5 volumes of liquid naphtha per volume of catalyst space per hour until the catalyst has become partially spent, then increasing the pressure in the catalyst chamber and contacting said partially spent catalyst under said increased pressure with hydrocarbon charging stock containing about 5 to 50 mols of hydrogen per mol of stock under such conditions that hydrogen is consumed, the carbonaceous deposit on the catalyst is reduced, and additional high quality motor fuel is produced.

2. The method of claim 1 which includes the further step of reducing the pressure in the catalyst chamber after the second contacting step and dehydro-aromatizing further amounts of low knock rating naphtha by contact with said catalyst prior to regeneration.

3. The method of converting low knock rating charging stock into high knock rating motor fuel which comprises dehydro-aromatizing a low knock rating naphtha by contacting it with a catalyst selected from the class consisting of molybdenum, chromium, tungsten, uranium and vanadium oxides and mixtures thereof supported on alumina at a pressure within the approximate range of 30 to 450 pounds per square inch at a temperature of about 875 to 1025° F. and at a space velocity which is sufficiently low to convert aliphatic hydrocarbons into cyclic aromatic hydrocarbons, whereby hydrogen is produced, admixing said hydrogen with additional charging stock in proportions of about 5 to 50 mols of hydrogen per mol of said charging stock and contacting said mixture with said catalyst under pressures of about 450 to 3000 pounds per square inch under such conditions that hydrogen is consumed, and further quantities of high quality motor fuel are produced.

4. The method of claim 3 wherein the additional charging stock is of substantially the gasoline boiling range and wherein the temperatures in the second contacting step are about 400 to 800° F.

5. The method of claim 3 wherein the additional charging stock contains substantial quantities of hydrocarbons heavier than gasoline and wherein the temperatures in the second contacting step are about 800 to 1000° F.

6. The method of operating a hydrocarbon conversion system employing an alumina supported catalyst selected from the class consisting of molybdenum, chromium, uranium, tungsten and vanadium oxides and mixtures thereof, which method comprises contacting said catalyst with a low knock rating aliphatic naphtha under conditions for the production of high knock rating motor fuel and hydrogen until said catalyst is partially spent, contacting said partially spent catalyst in said system with a different charging stock of substantial olefinic content in the presence of a large amount of added hydrogen under conditions for simultaneously hydrogenating said olefinic charging stock and reducing the carbonaceous deposit on the catalyst with the consumption of substantial amounts of hydrogen, and employing in said last-named contacting step at least a part of the hydrogen produced in said first-named contacting step.

7. The method of operating a hydrocarbon conversion system employing a dehydro-aromatization catalyst which comprises contacting said catalyst with a low knock rating naphtha under such conditions that naphtha is dehydroaromatized, and hydrogen is produced until the catalyst becomes partially spent, then contacting said partially spent catalyst in said system with additional charging stock in the presence of increased amounts of hydrogen within the approximate range of 5 to 50 mols of hydrogen per mol of additional stock charged and under such conditions that hydrogen is consumed, the carbonaceous deposit on the catalyst is reduced and additional high quality motor fuel is produced, at least a part of the hydrogen produced in the first-named contacting step being employed and consumed in said second-named contacting step.

ROBERT F. MARSCHNER.
LLEWELLYN HEARD.
ALEX G. OBLAD.